Figure 15:
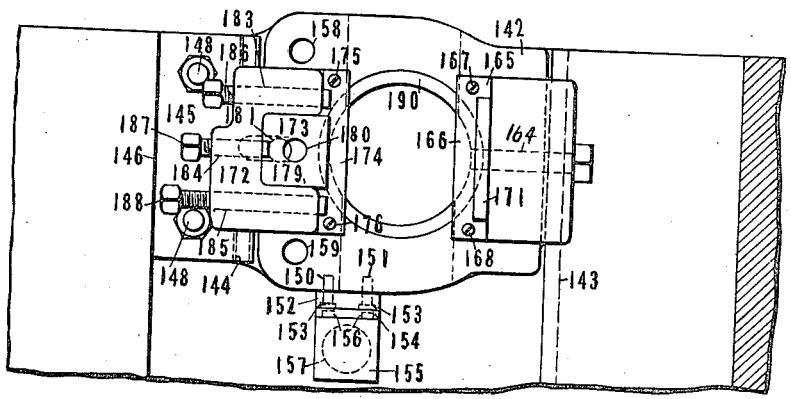

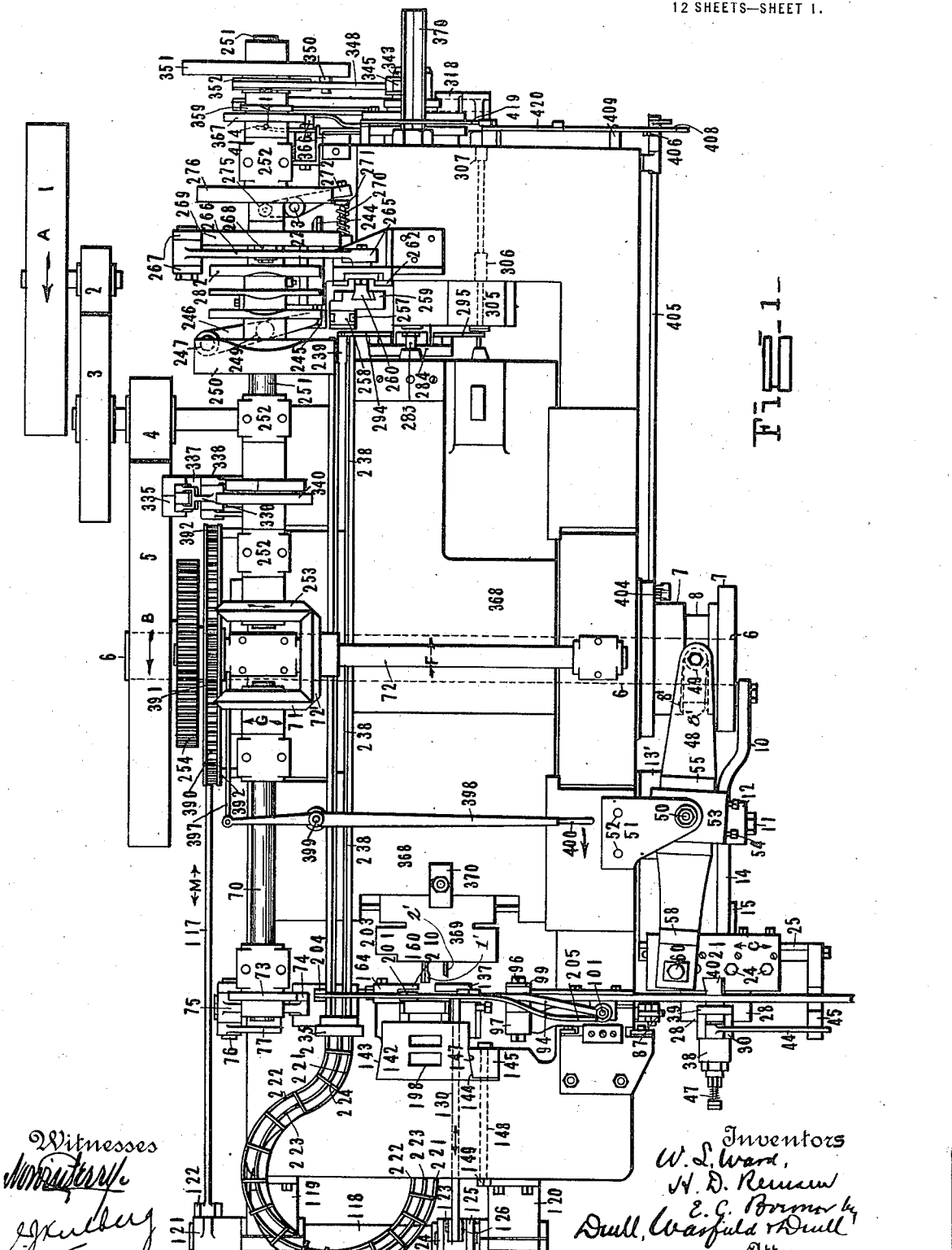

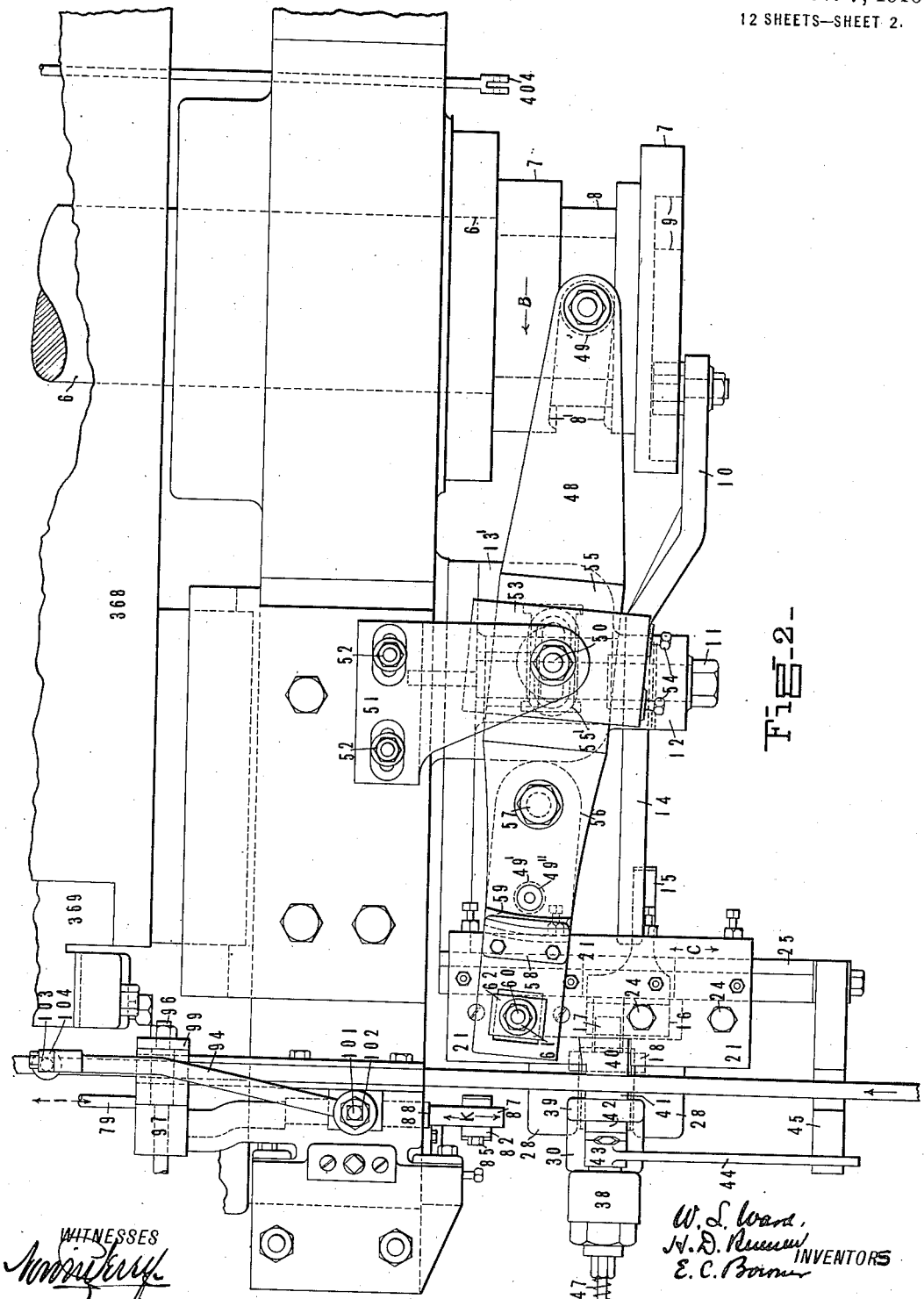

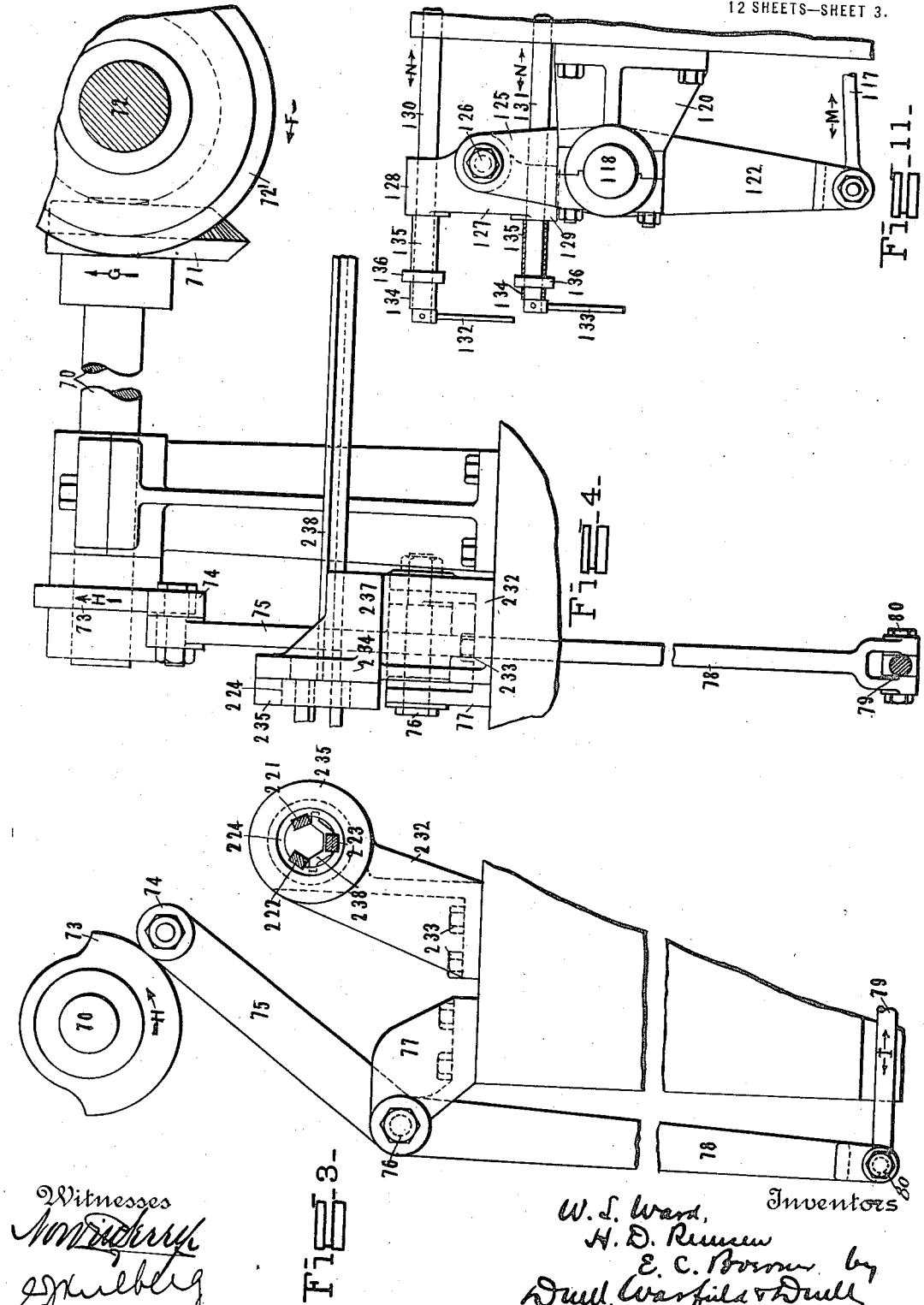

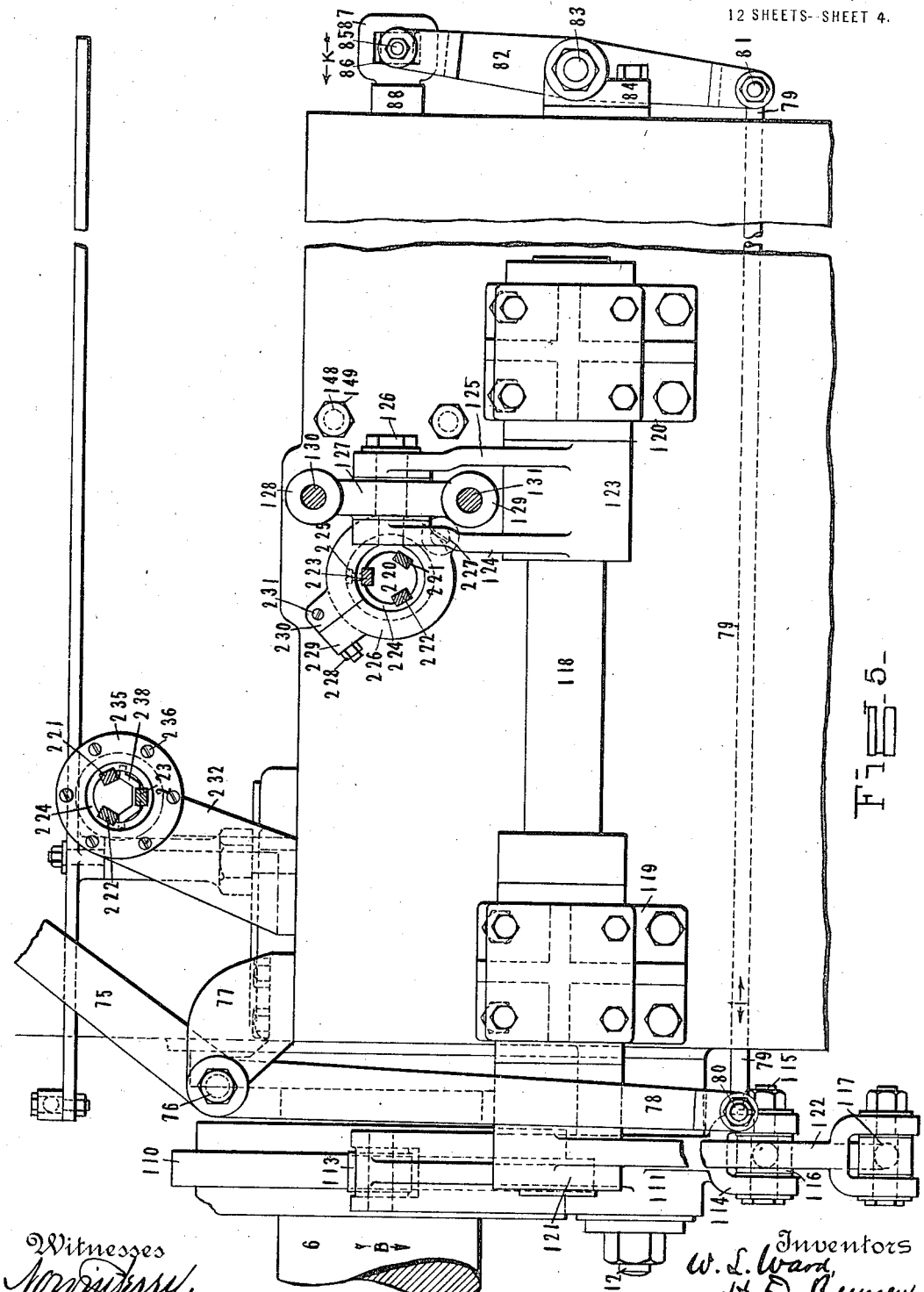

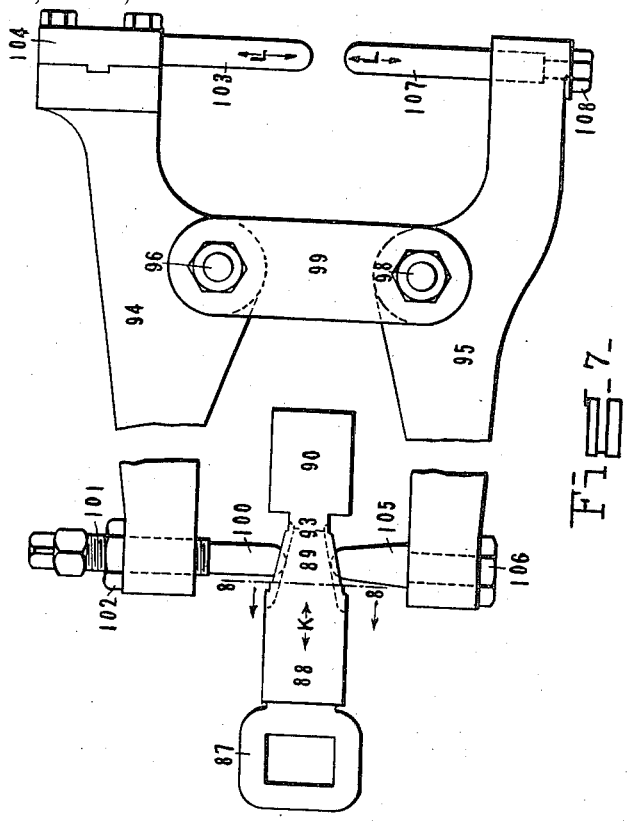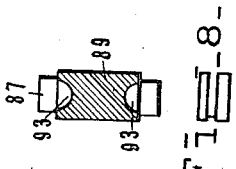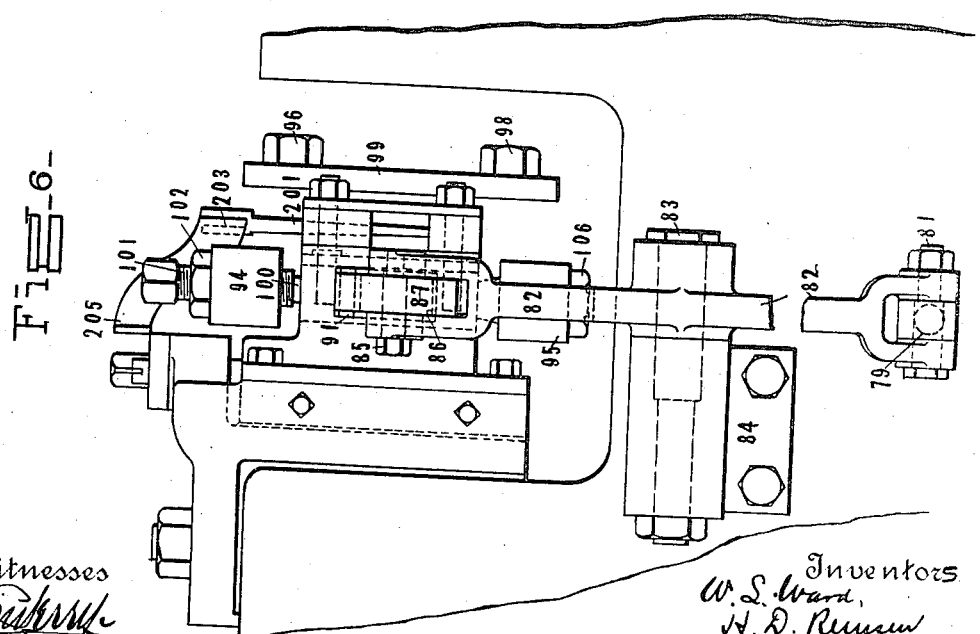

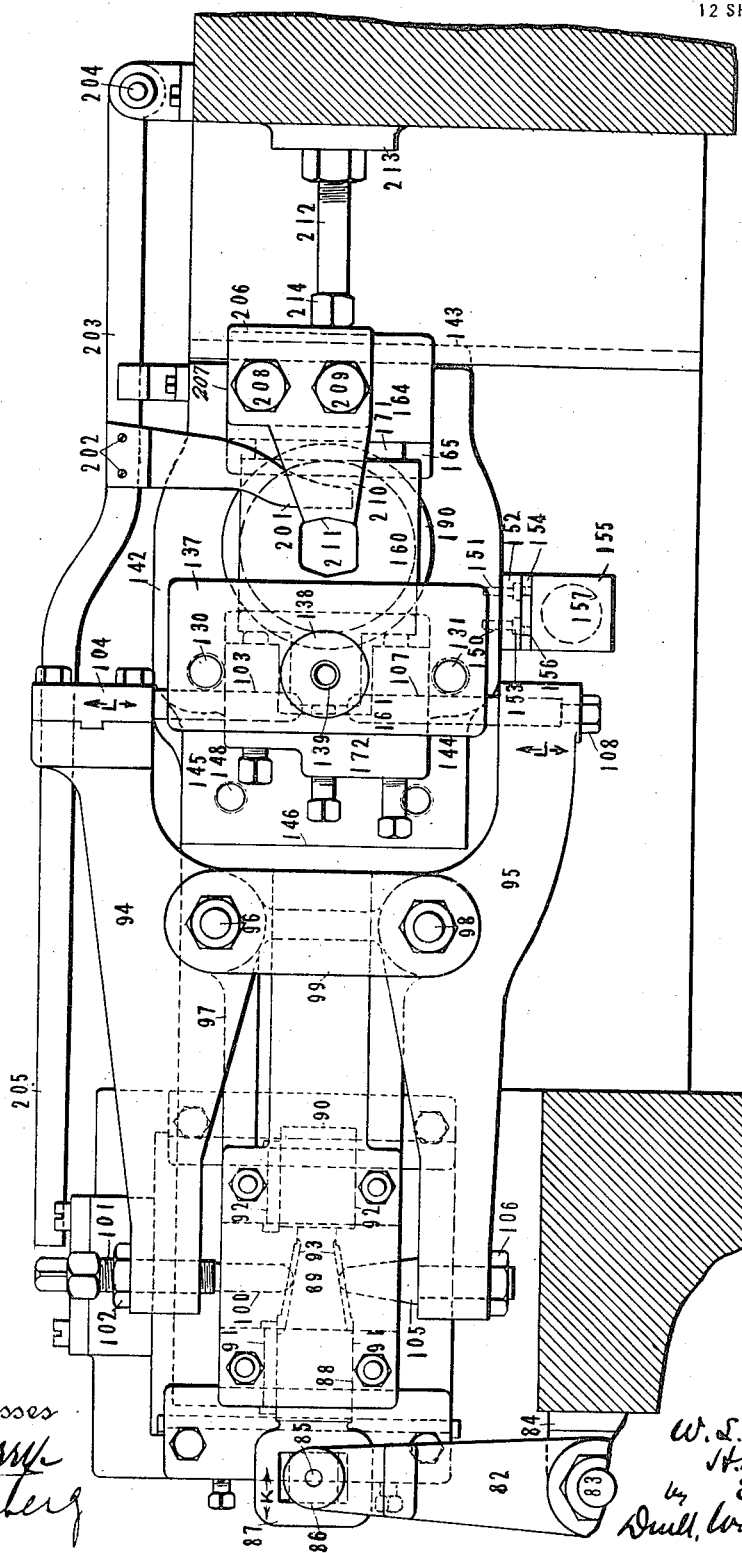

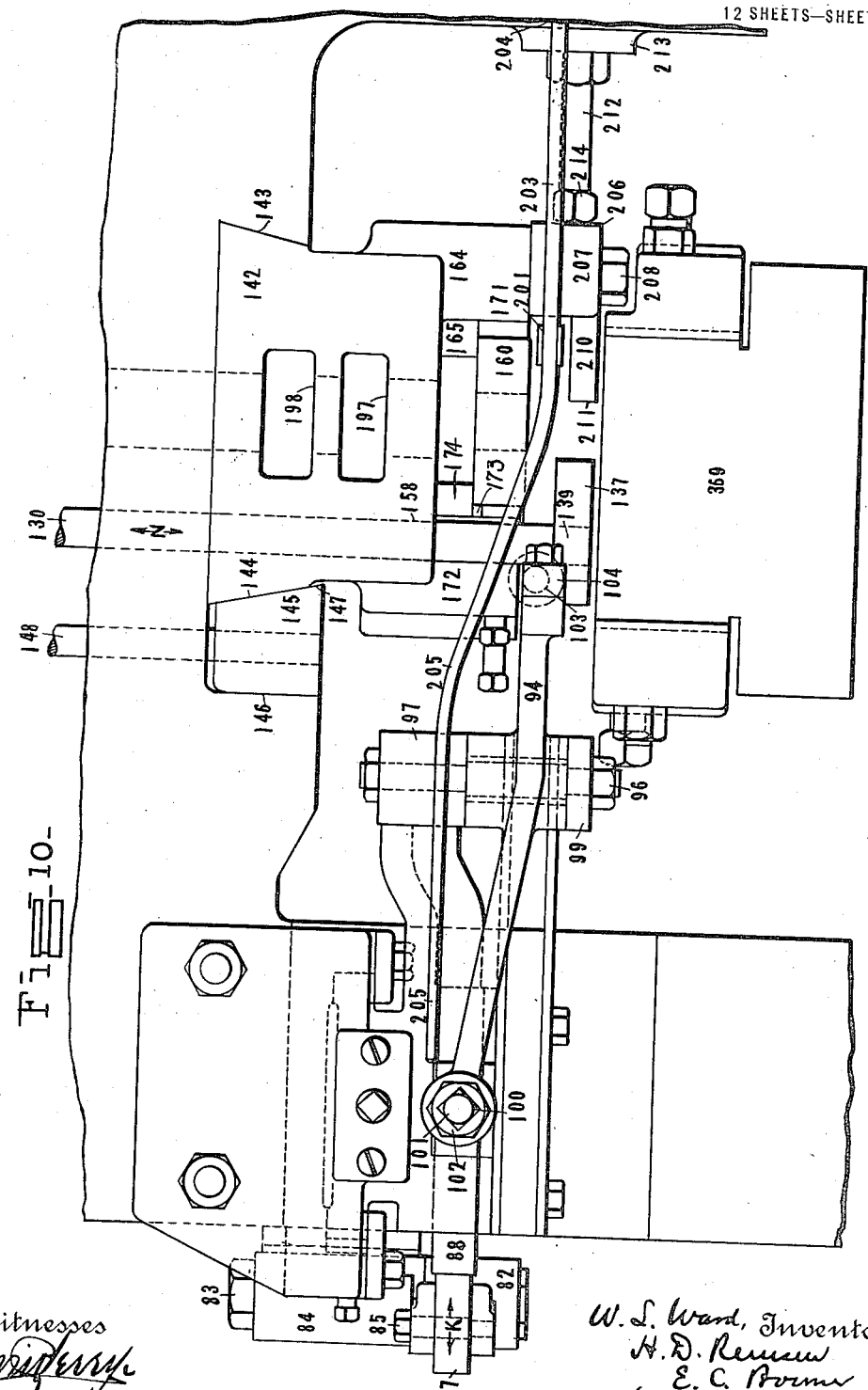

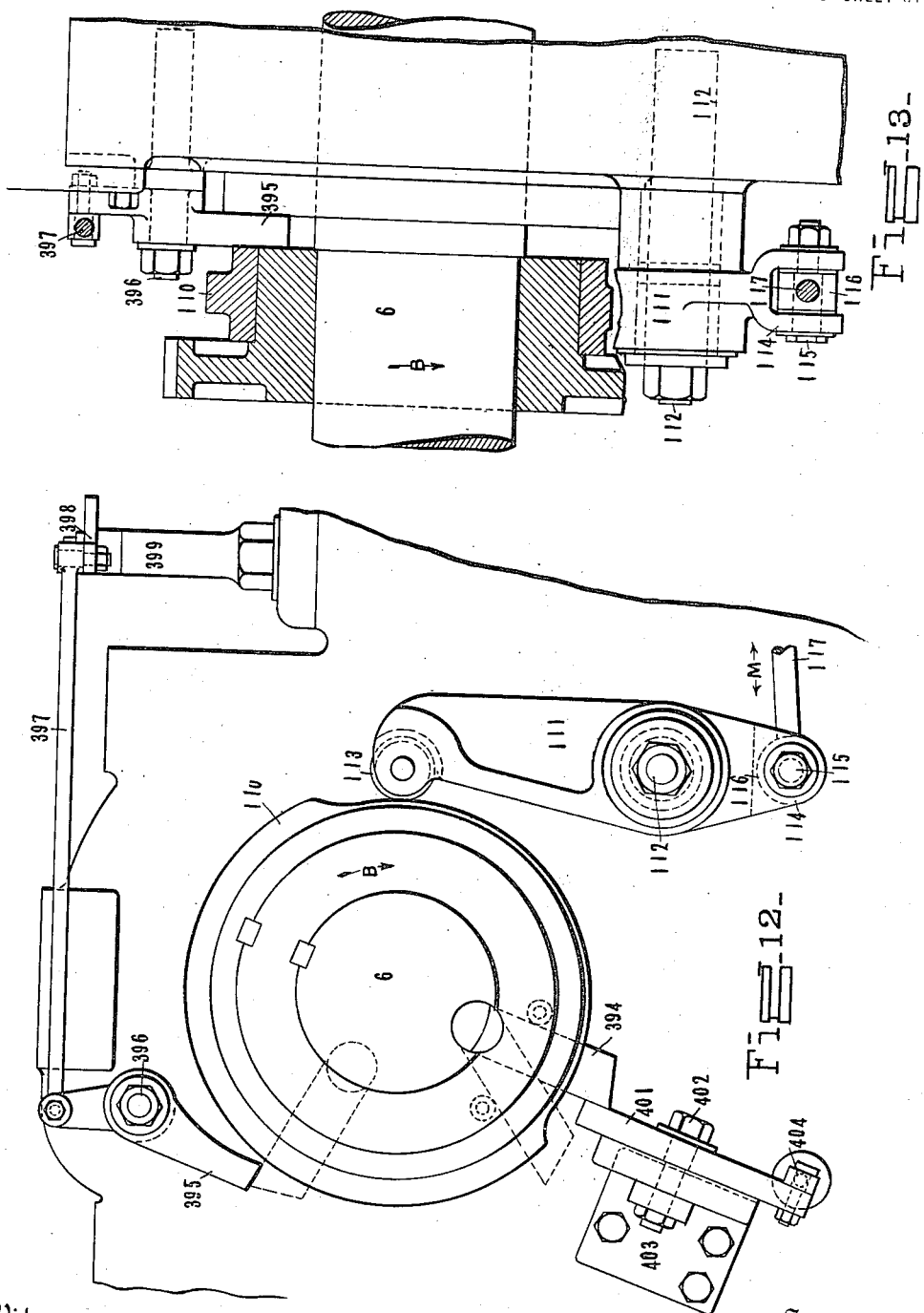

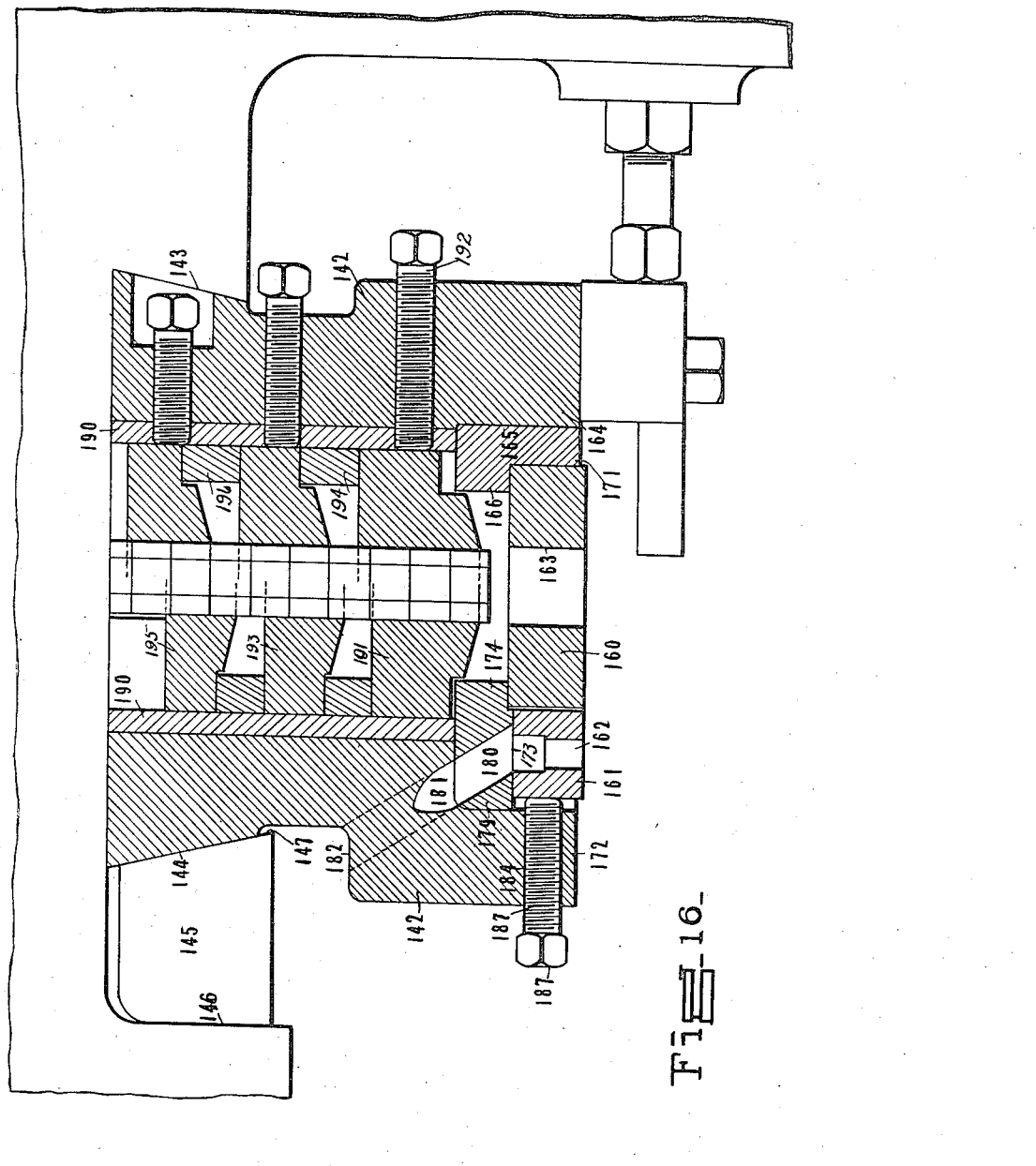

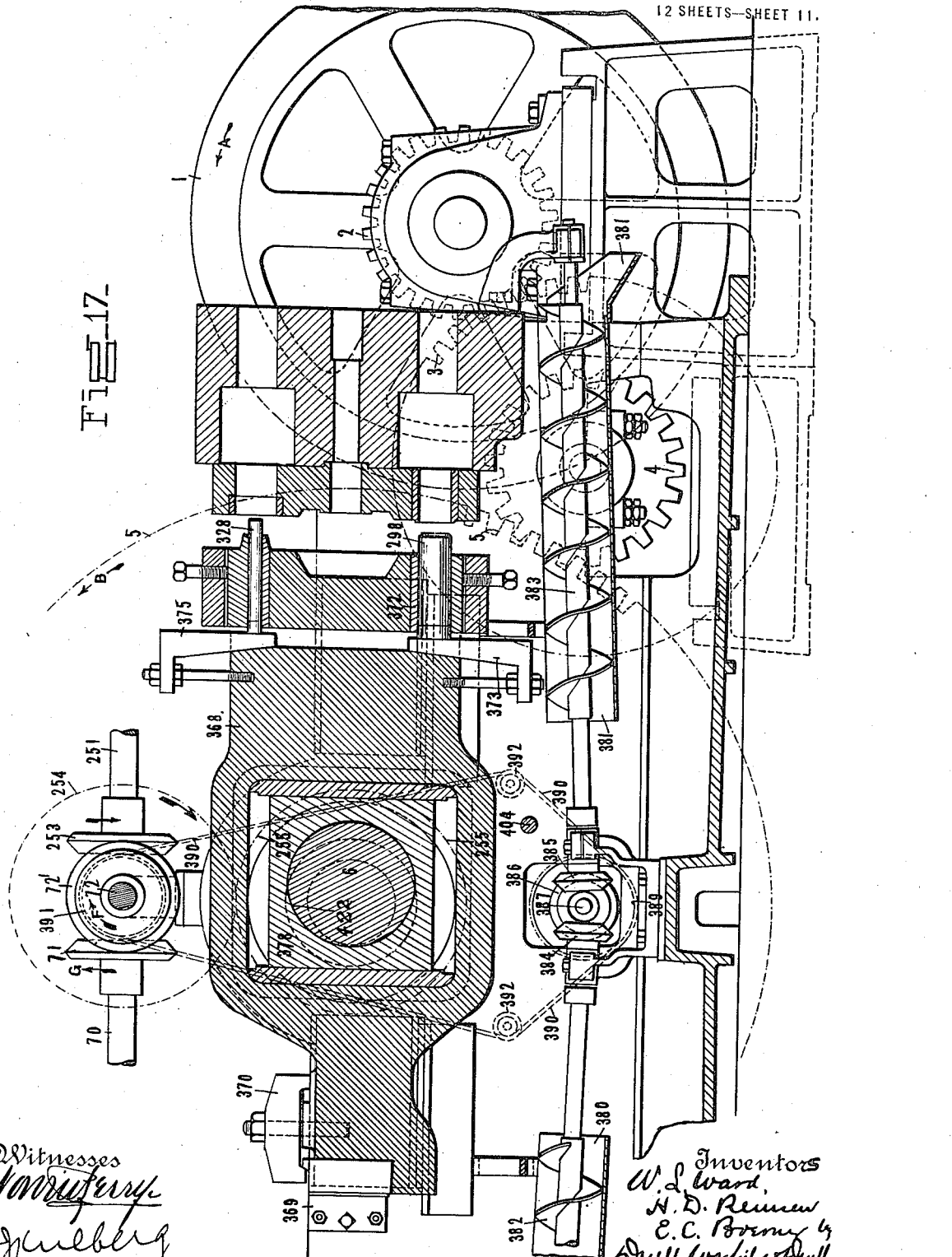

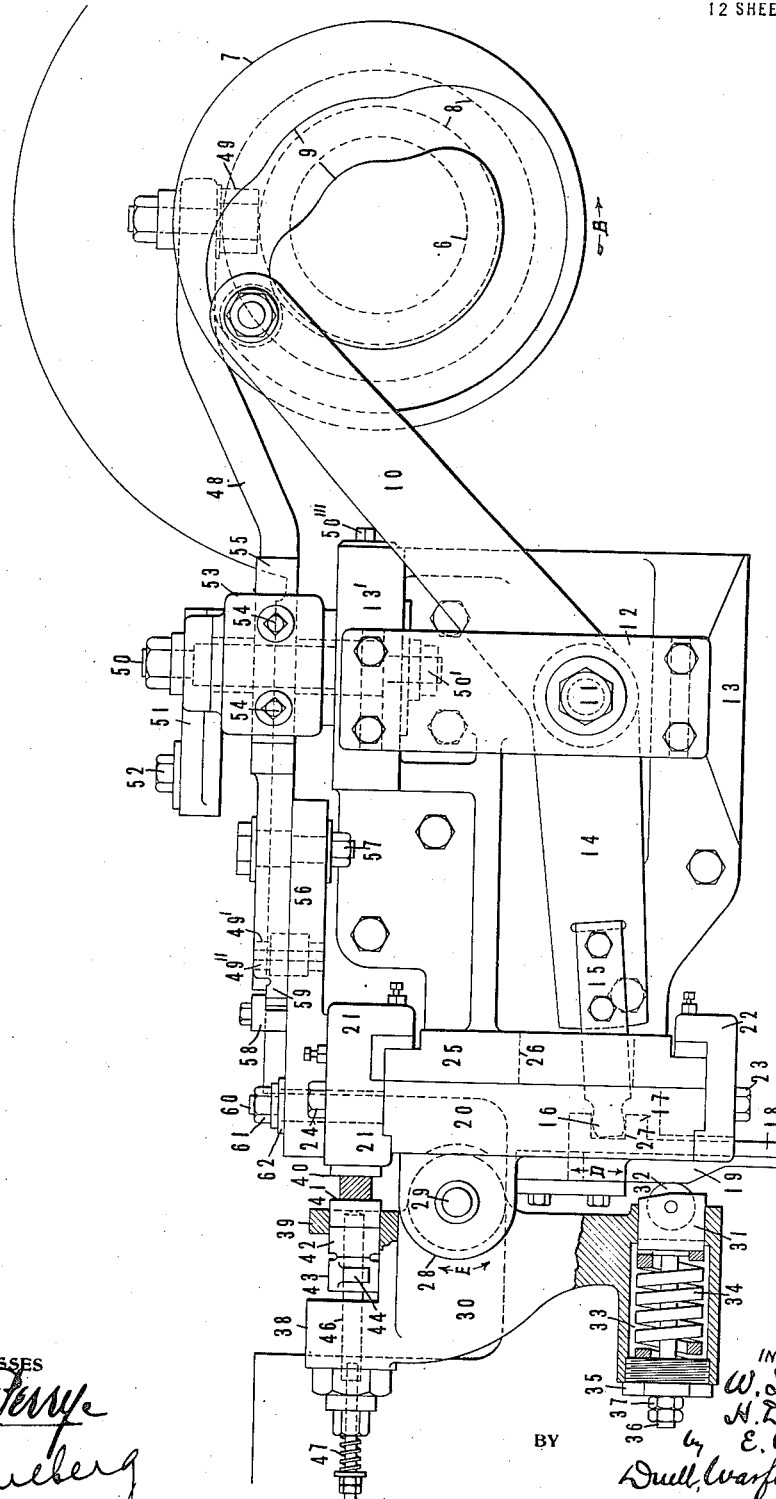

UNITED STATES PATENT OFFICE.

WILLIAM L. WARD, HERBERT D. REMSEN, AND EMILE C. BOERNER, OF PORT CHESTER, NEW YORK, ASSIGNORS TO RUSSELL, BURDSALL & WARD BOLT AND NUT CO., OF PORT CHESTER, NEW YORK, A CORPORATION OF NEW YORK.

NUT-MAKING MACHINE.

1,203,823.     Specification of Letters Patent.     Patented Nov. 7, 1916.

Original application filed June 27, 1910, Serial No. 569,053. Divided and this application filed April 27, 1912. Serial No. 693,605.

*To all whom it may concern:*

Be it known that we, WILLIAM L. WARD, HERBERT D. REMSEN, and EMILE C. BOERNER, citizens of the United States, residing at Port Chester, in the county of Westchester and State of New York, have invented certain new and useful Improvements in Nut-Making Machines, of which the following is a full, clear, and exact description, such as will enable others skilled in the art to which it appertains to make and use the same.

This invention relates to means instrumental in performing mechanical operations on stock, as by means of a punch, and it deals more especially with a mechanism for automatically positioning or centering the end of a stock-bar to bring the same accurately in alinement with the punches.

One object of this invention is to devise means capable of acting in conjunction with a device for longitudinally feeding a bar to definitely determine the lateral position of the bar.

Another object is to combine a centering means with a mechanism for clamping the stock in place during the operation of the punches.

Another object is to provide a bar-centering mechanism capable of acting as an intermediary between the stock-bar feeder and the punches, so as to automatically position the stock-bar accurately with reference to the punches and die apertures.

It is also an object of this invention to so devise, construct and arrange the bar-centering mechanism that it may be compactly positioned in a combined machine and will not interfere with or impede the action of the other elements with which it is closely associated.

A still further object is to render available an automatic bar-centering mechanism of a simple and durable character and capable of being very readily adjusted.

Other objects and advantages will be in part pointed out hereinafter and in part rendered apparent by means of the accompanying illustrations.

The invention accordingly consists in the features of construction, combinations of elements and arrangement of parts which will be exemplified in the construction hereinafter set forth, and the scope of the application of which will be indicated in the following claims.

To better show the adaptability of this mechanism for various types of machines, the drawings have been taken from a copending application, filed June 27, 1910, Serial No. 569,053 patented February 24, 1914, No. 1,088,192 (of which this application is a division), and in such drawings like characters of reference denote corresponding parts throughout all the views, of which—

Figure 14:
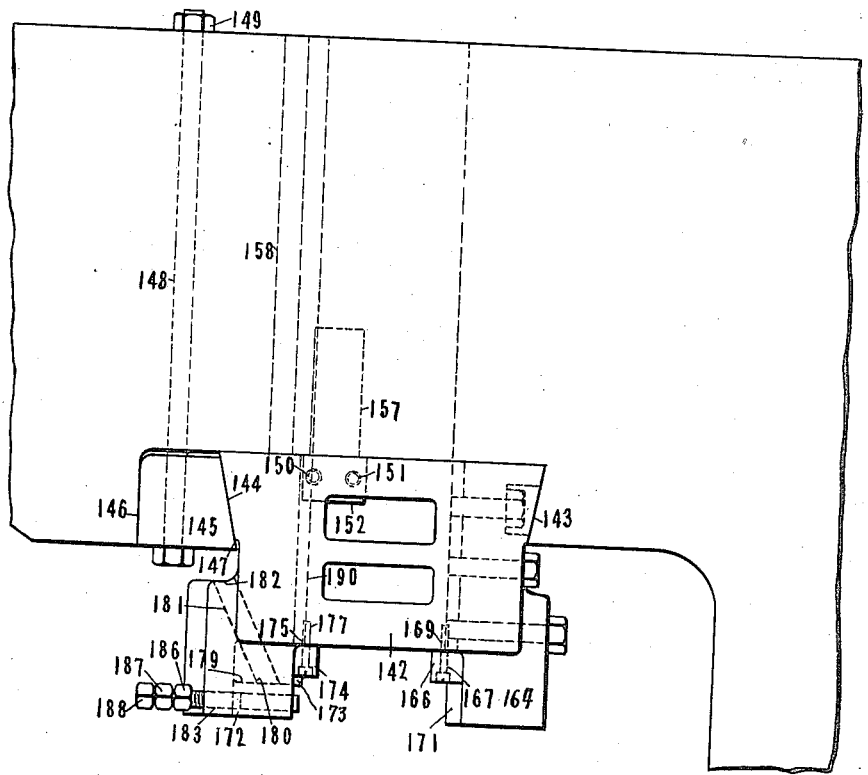

Figure 1 is a general assembly indicating one way of utilizing the centering and clamping means in a complete machine; Fig. 2 is a plan view of one corner of the unitary machine showing in detail the construction and arrangement of certain parts of the centering means combined with the stock-bar feeder; Fig. 3 is an end elevation showing the cam and rocker mechanism from which motion is primarily derived and by means of suitable mechanism transmitted to the centering mechanism; Fig. 4 is a side elevation showing further details of the cam and rocker mechanism illustrated in Fig. 3; Fig. 5 is an end elevation of the combined machine showing the two rockers on the right and left hand sides of the machine, respectively, which form parts of the mechanism for centering the stock-bar; Fig. 6 is a side elevation of the combined machine illustrating more especially certain details of the rocker 82 shown at the right hand end of Fig. 5; Fig. 7 is a detailed view with certain parts broken away, illustrating the construction of the centering tongs and the manner in which they coöperate with the centering cam; Fig. 8 is a section taken along line 8—8 of Fig. 7, showing the construction of the wedge-shaped grooved centering cam and the manner in which it coöperates with the centering tongs; Fig. 9 is a side elevation partly in section, of the centering mechanism arranged in conjunction with certain features of a combined machine, showing more particularly the direction of feed of the stock-bar and the manner in which the same is centered adjacent the point at which it is punched and successively sheared into roughly formed nut-blanks; Fig. 10 is a top plan view of the mechanism illustrated in Fig. 9, showing certain details not clearly apparent from the latter figure; Fig. 11 is a side elevation looking in the direction of the axis of the stripper actuating-shaft 118, which is mounted at the forward end of the machine. This figure shows a portion only of the mechanism employed for the purpose of clamping the stock-bar during the advance of the punches, and also for the purpose of subsequently assisting in stripping from the punch during its retreat so much of the stock as may adhere to the same; Fig. 12 shows another and more remote portion of the mechanism shown by Fig. 11, and illustrates in part cam mechanism whereby the reciprocating rod 117 derives its motion from the main shaft; Fig. 13 is a side elevation, shown partly in section, of the mechanism shown in Fig. 12; Fig. 14 is a view somewhat similar to Fig. 10, but showing additional features, and others eliminated for a more clear disclosure; Fig. 15 is a face view of the features shown by Fig. 14; Fig. 16 is a sectional detail showing the arrangement of the trimming dies; Fig. 17 is a longitudinal vertical section of the combined machine showing the operating mechanism of the reciprocating head; and Fig. 18 is a side elevation of the stock bar feeder.

*The bar-centering mechanism.*—The purpose of this mechanism is to insure that the stock-bar, when fed into operative relation with the punches and dies, will be in suitable registry with the same, so that deformed nut-blanks may not result from an imperfect positioning of the stock-bar.

To fully appreciate the usefulness of a bar-centering mechanism, it may be recalled that commercial stock-bars are necessarily more or less warped or irregular in shape, and therefore an ordinary channel or feedway would not alone suffice to insure absolute registry of the stock-bar over the shearing and cutting dies. Furthermore, it will be understood that during the shearing and cutting of the stock-bar, fins and other slight irregularities are quite commonly produced, and this also is another cause of irregularity. This invention proposes to obviate this difficulty by employing a pair of oppositely positioned centering fingers which grip the opposite sides of the stock-bar at a point closely adjacent the punch, so that the end portion of the stock-bar about to be operated on will be accurately and positively positioned, irrespective of any warping or twisting that may occur in the more remote portions of the bar.

This mechanism may now be specifically described. Turning now to Fig. 3, 70 denotes a cam shaft mounted above the main frame near and parallel with one side thereof. This cam shaft is continuously driven, as indicated by arrow G, by means of the beveled gear 71 in mesh with a right angled beveled gear 72' secured to the supplementary upper shaft 72 which, by means of a suitable mechanism, is driven by the main drive shaft 6, rotating as indicated by arrow F. At its other end, the shaft 70 carries a suitable cam 73, which is shown in larger detail by Figs. 3 and 4 and turns as indicated by arrow H. A bearing-block 77 is bolted or otherwise suitably secured to the main frame of the machine and this bracket 77 carries a pivot pin 76 which is suitably retained in place by means of nuts in the ordinary manner. A rocker is pivoted at an intermediate point to this bearing bolt 76 and the upper end 75 of the rocker carries a roller 74 which rides in contact with the periphery of the cam 73 and derives a rocking motion therefrom. This rocking motion is produced and reversed in direction at the lower extremity of the arm 78 of this lever, and by means of a suitable connecting bolt 80 is transmitted, as shown by arrow I, to the long rod 79 which passes (parallel with the stock-bar feed) from one side of the combined machine to the other, where it is connected by means of a bolt 81 with a second rocker 82. This is shown clearly by Fig. 5. Through the above described mechanism, the rocker 82 will be periodically actuated to interpose a centering cam between the ends of centering tongs, which at their other ends operate to bring the stock-bar precisely into the desired position. The manner in which this is done will presently appear. The rocker 82 is pivotally positioned at its center by means of a pivot bolt 83 which is in turn mounted in a suitable stationary bearing-block or bracket 84 secured to the side of the main frame of the machine. At its upper end, the rocker 82 is pivoted to a vertically sliding block 86 by means of a pivot bolt 85. This sliding bearing block 86 slides up and down (for the limited distance required to correct for the slight rise and fall of the upper end of the rocker 82), in a suitable bearing recess in the end 87 of the centering cam 88, thereby translating such cam, as indicated by the arrow K. The detailed construction of this cam is shown somewhat more clearly by Figs. 7 and 9. It comprises two end bearing portions 88 and 90 which have a sliding bearing in suitable slideways 91 and 92 provided by the main frame of the machine and illustrated by dotted lines in Fig. 9. The intermediate portion 89 of the centering cam is wedge-shaped and its upper and lower inclined contact faces are grooved, as illustrated more clearly by Fig. 8, so as to form suitable continuously operative surfaces or raceways for the contact fingers of the centering tongs. As shown by Fig. 8, these raceways or tracks are preferably grooved, as indicated by 93, and the contacting tips of the actuated fingers of the tongs have a counterpart formation. The tongs are shown more clearly in Figs. 7, 9 and 10, and consist of two swinging arms 94 and 95. The upper arm 94 is, by means of a pivot bolt 96, supported at an intermediate point by a standard 97 projecting from the frame of the machine, and the other centering arm 95 is in like manner pivoted to a bolt 98, also secured to a suitable part of the main frame of the machine. The outer ends of the pivot bolts 96 and 98 are preferably secured together by means of a short heavy distance link 99, which is adapted to maintain the outer ends of the bolts in parallelism and prevent bending or displacement of said bolts under the stresses of the centering mechanism. At its actuated end, the centering arm 94 carries the finger 100, which finger has a screw-threaded shank 101 and is screw-threaded through an aperture in the arm 94 and securely retained in place in a predetermined position by means of a lock-nut 102. This arrangement enables the operator to readily set the finger 101 so as to accurately locate the arm 94 within suitable limits. At its forward end, this arm 94 detachably carries the centering finger 103, which is secured in place in any suitable manner, as by a block 104, which preferably is dovetailed on the end of the arm 94 so as to enable the centering finger 103 to be shifted transversely. The companion arm 95 of the centering device also carries an actuating cam finger 105, which is retained in place by means of a nut 106, and at its forward end also carries a centering finger 107 secured in the corresponding end of the arm 95 by means of a nut 108.

When the cam 73 rotates, the various parts above described will be operated, resulting in a reciprocation of the centering cam 88 and producing a scissors-like movement of the levers 94 and 95, thereby causing the centering fingers 103 and 107 to approach, as indicated by arrows L, in the predetermined manner always equi-distant from the center line of the stock-bar, and thus cause the stock-bar which is gripped therebetween at circumferentially different portions to be centered and brought into the desired precise registry with the punches and apertures, said members 103 and 107 pressing said bar in a direction transversely of the punching axis.

*Stock-bar punching clamp and stripper.—* This mechanism has a two-fold function, i. e., first, to clamp the stock-bar tightly in place at the instant of punching so as to prevent any displacement under the forcible action of the punches; and second, to enable the punch to be wholly withdrawn from the newly formed aperture in the stock-bar and thus entirely release the same from any engagement or sticking together due to fins or irregularities produced by the punch; whereby the feed may be continued. This mechanism is shown more clearly by Figs. 1, 5, 9, 10, and 11. The source of power for this mechanism is also derived directly from the main shaft 6, which carries the cam 110 (shown best in Fig. 5), which rotates in the direction indicated by the arrow B. A rocker arm 111 is pivoted at the side of the frame of the machine adjacent this cam by means of the pivot bolt 112, and the upper end of this rocker arm 111 carries a roller 113 which rolls in contact with the periphery of the cam 110 during the rotation of the main shaft 6 and thus imparts a corresponding oscillation to the rocker arm 111. The lower end of this rocker arm terminates in the form of a yoke 114, which carries a pivot pin 115 passing through the appropriately shaped end 116 of the elongated rod 117. This rod 117, therefore, has a limited reciprocation, as indicated by the arrow M, and as appears more clearly from Fig. 1 this rod 117 extends along the side of the machine to the end of a transversely extending shaft 118, shown in plan view by Fig. 1, in side elevation by Fig. 5 and in end elevation by Fig. 11. This shaft 118 is secured to the end of the main frame of the machine by means of journal boxes 119 and 120. Keyed to one end of this shaft 118 is the hub 121 of a lever arm 122, to which is pivoted the end of the elongated reciprocating rod 117. In consequence of this connection, it is evident that as the main shaft rotates, the end shaft 118 will be oscillated through the instrumentality of the long rod 117 and the lever 122. This oscillation is in turn utilized to pull a punch stripping plate against the stock-bar to clamp the same accurately in position while the stock-bar is being punched, and then to move or permit this stripping plate to move out of clamping position while the punch is being withdrawn from the stock-bar, and thus enable the punch to be pulled away from the stock-bar to permit a subsequent feeding. This instrumentality comprises a U-shaped lever having its hub 123 keyed to a suitable portion of the shaft 118 and having its two parallel arms 124 and 125 supporting a pivot pin 126 at their upper ends. This pivot pin 126 carries a yoke-block 127 having two oppositely located lugs 128 and 129 which provide apertures through which freely pass the ends of parallel rods 130 and 131. These rods terminate at their extremities in handles 132 and 133, which are fastened securely in place by means of suitable pins and by means of which the rods 130 and 131 may be rotated for purposes of adjustment.

Intervening between the abutment shoulder of handle 132 and the apertured lug 128 are two tubes 134 and 135, which tubes are separated from one another by one or more distance rings 136. That is to say, in case it is desired to shorten the distance between the handle 132 and the hub 128, one or more of the rings indicated by 136 can be removed, or narrower rings substituted. A similar construction is resorted to with reference to the lower rod 131, and being clearly shown by Fig. 11 need not be specifically described. The rods 130 and 131 enter the machine body at one end thereof and pass longitudinally at right angles to the direction of feed of the stock-bar and terminate in a suitably located punch stripper plate 137 (see Figs. 1, 9 and 10). The ends of the rods which engage the plate 137 are screw-threaded, as indicated by the dotted lines in Fig. 9, thereby enabling the position of the block 137 to be very precisely determined and regulated by means of the hand levers 132 and 133. These rods 130 and 131 reciprocate transversely in direction to the feed of the incoming stock-bar, as indicated by the arrow N.

It may be observed that the block 137 is positioned at the side of the stock-bar adjacent the punch, the other side of the stock-bar being adjacent the die aperture into which the punch projects the plug of metal from the stock-bar. The block 137 is preferably provided with a replaceable jig 138 having an aperture 139 therein, through which the punch for producing the aperture in the nut-blank may travel.

When the stock-bar is interposed in place preparatory to having the small round aperture corresponding to the aperture in the nut-blank roughly punched out of the same, the punch stripper plate or jig block 137 will, through the above-described apparatus, be drawn tightly against the stock-bar so as to assist the centering fingers in securely positioning the same. Then the small round punch will pass through the jig opening 139 and perforate the stock-bar, forcing the resultant plug through the opening in the punch die.

The stock-bar feeder consists of a gripping means in the nature of a vise and a translating means for reciprocating such vise. The gripping means comprises a rock lever having an actuating end 14 and an actuated end 10, which latter carries a roller riding within the cam groove 9. As the shaft 6 turns the actuated end 10 rocks up and down, and this produces a corresponding movement in the actuating end 14. This lever is pivoted at an intermediate point by means of a pivot bolt 11, which is supported at its outer end by means of an uprising plate 12, which latter plate is bolted to lugs 13 which extend from the main frame of the machine. Mounted on the extremity of the arm 14 of the rocker lever is the toe or bearing piece 15 designed to actuate the cam controlling the bar gripping mechanism. This toe is detachably secured in place, as by means of bolts, so as to enable it to be replaced if unduly worn or injured. As shown, this toe projects through a suitable aperture, indicated by dotted line 26, in a stationary bearing block 25, along which bearing block slides the main piece 20, the top plate 21 and the bottom plate 22 of the bar-feeding mechanism. This aperture, indicated by dotted line 26, is slightly wider than the toe 15, but is considerably higher, so as to enable the toe 15 to travel vertically up and down during the operation of the gripping mechanism. The toe 15 passes through the stationary bearing block 25 and enters a horizontally elongated recess, indicated by dotted line 27 in a sliding block 20 forming a main part of the feeding mechanism. Inasmuch as this block 20 must be capable of reciprocating or translating horizontally a distance equal to that of the feed of the stock-bar, the recess indicated by dotted line 27 will be sufficiently long horizontally to avoid interference with the rounded extremity 16 of the toe 15. This extremity 16 resembles in shape a wide gear tooth and closely interfits within an open channel horizontally formed in a vertically reciprocating cam 17. This cam or bearing piece is carried by the block 20 and is capable of moving up and down, as indicated by the arrow D, independently of the position of the block 20; but on the other hand it is positively carried in a horizontal direction along with said block 20. To that end the cam 17 provides on either side an elongated guide or gib 18 which secures the cam 17 to the block 20, and yet enables it to freely rise and fall, i. e., slide up and down therein. The cam 17 is relatively narrow, and to enable its engagement with the gearlike extremity 16 of the toe 15 to be maintained, such extremity 16 is fully equal in width to the distance through which the stock-bar is fed.

It may here be stated that the recess indicated by dotted lines in the sliding or translating block 20 necessarily exceeds in height the distance through which the cam 17 is reciprocated by means of the toe 15.

The cam portion of the vertically reciprocating cam 17 is indicated by 19 and coöperates with a roller 32 indirectly carried by a swinging massive arm 30. The block 20, as has been stated, reciprocates horizontally and is slidably supported on the guide or bearing block 25. To that end, upper and lower cap plates 21 and 22 are securely bolted to the block 20 by means of bolts 23 and 24, so that these three pieces reciprocate as a unit. Means are provided for taking up and adjusting wear, as clearly appears from Fig. 2.

Extending from the block 20 are two lugs 28, in which is journaled the lever pin 29, which in turn supports the massive swinging arm 30 so as to enable the latter to have a limited angular movement, as indicated by the arrow E. This movement is utilized in gripping the stock-bar and is produced through the instrumentality of the cam 17 and the parts which will now be described.

A block 31 is mounted in a counterpart recess in the lower end of the massive swinging arm 30 and has a certain amount of possible play which is permitted on the one hand by a spring and limited on the other hand by a suitable adjustable stop, preventing the same from protruding too far under the influence of such spring. This part 31 carries the roller 32 which coacts with the cam 19, and 34 indicates the spring which is housed within a suitable recess 33 and is capable of being adjusted as to tension by means of the cap screw 35. A stem 36 extends from the part 31 and passes freely through the cap screw 35 and is provided externally with a pair of lock nuts 37 so that the outward movement of the part 31 may be positively limited, while the inward movement which necessarily more or less varies in extent, due to irregularities in the stock-bar, is taken care of by the powerful spring 34. From this it will be perceived that when the cam 17 is depressed by means of the toe 15, the roller 32 rides up the cam incline 19 and through the pressure of the spring 34 urges the lower end of the member 30 outwardly, and correspondingly urges the upper end of such part 30 in the opposite or inward direction. It is this latter end that is utilized in gripping the stock bar. The upper end of the arm 30 provides two integral lugs 38 and 39, which are spaced apart, as shown. Quite snugly, yet slidably fitting within a recess in the lug 39, is a vise block 41, which is preferably backed by means of a block 42, which in turn is positively positioned by means of the hub 43 of the hand lever 44. The block 42 and the hub 43 provide counterpart cams in their adjacent faces, and are so constructed that when the hand lever 44 is swung down so as to rest on the horizontal rest 45, the block 42 will be crowded outwardly, whereas when the arm 44 is moved through 90 degrees, the block 42 may be drawn back somewhat by means of the shaft 46 and the spring 47, thereby easing up the pressure between the vise block 41 and the stock-bar. An immovable vise jaw 40 is detachably secured to the top plate 21 in some suitable manner, such as by setting the same in a recess in the top plate 21. By this instrumentality, should it be desired to stop the feeding of the stock-bar temporarily without stopping the entire machine, or should it be desired to adjust the extent of entry of the stock-bar in the machine (as when a new bar is required), the operator, by lifting the handle 44, can release the vise jaws from the stock-bar, irrespective of the position of the feeding mechanism, and thereupon the freed stock-bar can be manually adjusted in position. Upon turning the handle 44 to its normal position, the machine will be ready to resume its cycle of operations.

The feeding means for horizontally reciprocating the vise-bearing top plate 21 will now be described. It may here be noticed that it is highly desirable to so construct and arrange the elements controlling the reciprocations of the stock-bar vise, as to enable adjustments to be easily made whereby the extent and periodicity of the automatic feed may be regulated and accurately determined. To that end, this invention proposes a multipart lever 48, which at one end carries the roller 49 which coacts with the circumferential cam 8. This lever is pivotally supported at an intermediate point and has its free end, so to speak, connected with the top plate 21 of the feeding structure. The relation between these three points will determine the character of the feed and therefore means have been adopted to enable this relation to be varied within reasonable limits. Thus, the bolt 50 constitutes the intermediate pivot of the lever 48, but this bolt is so arranged and constructed as to be capable of being secured in various positions. It will be seen that the lower end of the bolt passes through a shelf-like portion 13′ extending from the main frame of the machine. This portion 13′ is provided with a rectangular recess into which is fitted the block 50″ and below this block is located the slot 55′ through which the shank of the bolt 50 passes. A nut 50′ serves to lock the bolt and block in position against movement. For the purpose of facilitating adjustment, the adjusting bolt 50‴ is provided and said bolt is rotatably mounted in the frame portion 13′ and has a screw-threaded shank in engagement with the block 50″, so that by turning the bolt said block may be shifted in position. The upper end of the bolt 50 passes through a detachable lug 51 which is in turn adjustably secured to the main frame by means of bolts 52 passing through suitable slots. In this way the position of the bolt 50 with respect to the main frame may be varied at will. The lever 48 is also adjustably mounted in the saddle block 53 by means of bolts 54 which are adapted either directly or through the instrumentality of an insert-piece, to clamp the snugly fitting part 55 of the lever 48 in a corresponding aperture in such block 53. It is to be understood that the pivot bolt 50 has its bearing directly on the swinging block 53 and passes through the elongated aperture, indicated by dotted lines 55'. From this it will be readily understood that the exact position of the pivot bolt 50 may be very readily secured.

At this point attention is directed to a safety appliance employed in connection with the feed mechanism. It may occasionally happen that either because of a failure to sufficiently clear away the metal cut from the forward end of the stock-bar, or for other reasons, the forward progress of the stock-bar will be unduly or even positively obstructed, and to prevent the feeding mechanism from being damaged or fractured by reason of its inability to advance the stock-bar, this invention contemplates so constructing the lever 48 that a suitably positioned safety pin, amply strong for all ordinary purposes, will be sheared and thus prevent rupture of this lever or other element of the feed mechanism. To that end, the forward or actuating end of the lever 48 terminates somewhat short and extends in the form of the extension piece 56, which is pivoted to the same by means of a strong bolt 57. A clamping block 58 which engages a circular lip 59 which is integral with the forward end of the lever, also assists in positioning these parts. Adjacent the extremity of the forward end, is an aperture 49' which enlarges toward the under surface of such part and is in registry with the corresponding aperture in the extension piece 56. A safety pin 49'' fits in and is retained by these alined apertures, so that in case the pressure becomes at any time excessive, this pin may be readily sheared and may then be replaced by a duplicate part. This invention also embodies means for adjusting the relative position of a pivot bolt 60 which is directly instrumental in connecting the sliding vise block 21 with the actuating lever. The extension piece 56 is provided with a square recess adjacent its end, within which is adjustably positioned a block 62 which is clamped in place by means of the nut 61 on the pivot bolt 60. It will from this be readily perceived that it is a very simple matter to so adjust the lever 48 as to feed the vise block 21 and its associated parts through any desired feed spacing.

The operation of the stock-bar feed mechanism will be obvious from the foregoing, but may be briefly recapitulated as follows: Assuming the parts to be in the position shown by Fig. 2, in which the stock-bar feeder is in the advanced position, the further rotation of the main shaft 6 will raise the lever end 14, thus uplifting the cam 19 and permitting the arm 30 to swing back to ease up the clamping pressure on the stock-bar. The circumferential cam 8 is so designed that the roller 49 will now be caused to move toward the frame of the machine so as to swing the other end of the lever 48 in the opposite direction and thereby move the released gripping vise along the stock-bar a distance corresponding to the length of a blank. During this withdrawal of the vise the stock-bar is not moved, but at the end of the backward stroke the cam 9 operates on the lever arm 10 to actuate the part 18 and thus cause the cam 19 to outwardly move the roller 32 and swing the arm 30 into a position adapted to grip the stock-bar. Thereupon the circumferential cam 8 acts on the roller 49 to swing the lever 48 in a direction such that the vise will be advanced as indicated by the upper head of the arrow C, and thus feed stock-bar into the machine a distance corresponding to the length of a nut-blank. This brings the end of the stock-bar opposite the shearing-off punch 1' (Fig. 1) so that as the latter now advances a nut-blank will be sheared from the end of the stock-bar. It will be noticed that this shearing-off punch extends forwardly some little distance beyond the forward extremity of the perforating punch 2' (Fig. 1) so that the shearing-off punch will perform its function just before the perforating punch operates. When the perforating punch advances to perforate the stock-bar near its end, it may be observed that the stock-bar is deformed and elongated through the action of the perforating punch to an extent sufficient to cause the end of the stock-bar to bind unduly against the shearing-off punch during the withdrawal of the latter. It will be understood that the shank of the shearing-off punch is slightly undercut and that this binding action would take place near its head. To prevent this action, however, this invention proposes a construction whereby the stock-bar is retracted a slight distance just after the perforating punch has been withdrawn, thereby affording a free withdrawal of the shearing punch. This is accomplished by providing the circumferential cam 8 with a slight undercut 8' so that the roller 49 will be given a slight movement toward the frame of the machine just after the perforating punch has been withdrawn, thereby effecting a slight retraction of the stock-bar during the withdrawal of the shearing-off punch.

*The punches and dies for perforating and shearing rough blanks from the stock-bar.—* The purpose of this mechanism is to first pierce a hole in the stock-bar adjacent its end, and then to cut off a portion of such stock-bar in such manner that said hole will be centrally located in such portion and serve as the nucleus, so to speak, for the threaded center bore of the finished nut.

This mechanism comprises a stationary wedge-shaped block 142 adapted to support the several trimming dies and the cutting off die, and which is rigidly mounted in the main frame of the machine adjacent one end. This may be simply and efficiently accomplished by providing the block 142 with inclined side faces 143 and 144, and providing the main frame with a recess adapted to receive such die block, and having an undercut edge portion conforming to the inclination of the face 143 of the die supporting block. The gib 145 provides a right angle face 146 which has a sliding fit with a corresponding portion of the main frame of the machine, and it also has an inclined face 147 conforming to the face 144 of the die-supporting block. This gib 145 is provided with a pair of spaced internally threaded apertures through which are screw threaded the ends of two long bolts, one of which is indicated by 148 on Fig. 10. The end of such bolt carries a nut 149 which bears against the end face of the main frame of the machine, and by screwing up these bolts, the gib block 145 will be drawn home as tightly as may be desired, and as a consequence the die-supporting block 142 will be firmly and positively positioned in the frame.

The support for the underside of the die-supporting block preferably is so formed as to eliminate wear, and to that end the under surface of the block 142 is provided with screw-threaded holes 150 and 151 which are in registry with corresponding apertures in a hardened steel rest plate 152 so as to enable the latter to be securely positioned in place by means of the screws 153. This hard plate is useful in resisting wear. This hardened plate 152 rests on a counterpart rest plate 154 which is positioned on the upper surface of the rest block 155 by means of the pins 156. This rest block 155 simply consists of an integral piece having a shank 157 which has a driving fit in a corresponding aperture in the main frame of the machine and terminates in a square head, as above described. The die-supporting block is preferably formed of a single piece of machine steel having two upper and lower apertures 158 and 159 through which may freely pass the rods 130 and 131 for actuating the above described bar clamp 137. This block also comprises means for retaining the several dies for shearing and trimming the blanks and for discharging the material severed by the same. This construction is shown more clearly by Figs. 14 to 16. The rough shearing die consists of a piece of hardened steel, indicated by 160, secured adjacent a relatively small size extension or core die 161 having a central die aperture 162 for coacting with the punch in punching out the core or central portion of the nut blank. The die 160 also provides the central die aperture 163 which coacts with a counterpart punch for the purpose of severing sections roughly approximating the shape of the finished nut blank from the end of the stock-bar. To enable this die plate 160 to be adequately mounted on the die block, this invention proposes a strong, massive extension or lug 164 extending forwardly at one side of the front face of the die block 142. This extension 164 serves to coöperate in positioning the hardened flanged backing plate 165. That is to say, this backing plate 165 has a base portion 166 apertured at 167 and 168 to enable machine screws to secure such base portion directly to the front face of the die block by coöperating with the threaded holes 169 and 170 in the face of such die block. The backing plate 165 also comprises the narrow elongated extension 171 which, at its back, rests snugly against the massive lug 164 and has its exposed face adapted to coöperate with the edge of the die plate proper to retain the same in place and form a shelf, so to speak, for supporting the same. A somewhat similar construction is employed on the opposite side of the main die block 142. That is to say, the latter provides a lug or extension 172, the intermediate portion of which is cut away or recessed, as shown, to provide for the reception of the core die backing plate 173. This plate 173 provides a base portion 174 having end apertures 175 and 176 in registry with corresponding apertures, such as 177 in the main die block so as to enable the said two parts to be secured together by means of machine screws. The intermediate portion of the backing plate 173, however, assumes the form of an extension 179, which closely fits into the above-mentioned cut-away portion of the lug 172, as shown on the drawings. The extension 179 of the core die backing plate 173 also provides a perforation or channel 180 for conveying away the plugs which are forced out of the stock-bar by means of the core punch. As a matter of convenience, this perforation 180 is inclined horizontally toward the side of the machine on which the above-mentioned feed mechanism is arranged, and such inclined aperture is in registry with the corresponding perforation 181, which passes through the main die-supporting block 142. In this way, the plugs or chips are ultimately discharged from the main die block 142 adjacent the point indicated by 182.

From the above, it will be perceived that the rough shearing die plate proper may be set to rest at one end on the backing plate 165 and at the other end on the backing plate base 174. This will bring the edges of the die plate adjacent the three screw-threaded holes 183, 184 and 185, which pass horizontally through the lug 172 of the main die block. A corresponding series of set screws 186, 187 and 188 pass through these apertures and engage the edges of the die plate and thereby positively position the same.

The shearing punch 1' and the adjacent perforating punch 2' are carried by a supporting block 369, suitably fastened as by means of the clamp 370 to the reciprocatory head or sub-frame 368, the latter composed of a large solid casting. The head 368 is actuated from the main drive shaft 6 by means of the sliding block 378 which is journaled to the shaft 6 and adapted to slide up and down through suitable bearings in head 368, thus reciprocating the latter and with the necessary degree of power. The block 378 is pivoted in eccentric relation to the shaft 6, as by means of the eccentric 422.

It will thus be perceived that this invention is well adapted to achieve the aims and advantages aforesaid, and that it is characterized by simplicity, efficiency and sturdiness.

Having described our invention, what we claim as new and desire to secure by Letters Patent is:—

1. A mechanism of the nature disclosed, comprising punching mechanism two members adapted to abut opposite sides of a stock-bar to position the same during the punching operation, pivoted arms supporting said members, and automatic means for simultaneously causing each of said members to approach the other at an established predetermined rate of movement.

2. A mechanism of the nature disclosed, comprising punching mechanism two members adapted to be brought into abutment with the sides of a stock-bar to center the same during the punching operation, arms supporting said members and restricting the direction of movement thereof, cam means coacting with said arms adapted to positively move each of said arms at an established predetermined rate, whereby a corresponding movement will be imparted to said members and means to automatically move said cam relative to said arms.

3. A mechanism of the nature disclosed, comprising punching mechanism, a pair of arms each pivotally secured to a common base, a bar-centering finger carried by each of said arms, an actuating finger carried by each of said arms, a cam coöperating with said actuating fingers adapted to oscillate said arms to move said centering fingers toward one another and thereby center the bar during the punching operation, and means to automatically reciprocate said cam relative to said actuating fingers.

4. A mechanism of the nature disclosed, comprising punching mechanism, a pair of arms, each pivoted at an intermediate point to a common base, a centering finger carried by each arm on the same side of its pivot, said centering fingers terminating opposite to one another, an actuating finger carried by each of said arms on the other side of said pivot and terminating opposite one another, a cam intervening between said actuating finger and movable to simultaneously actuate the same and thereby cause said centering fingers to center the bar during the punching operation, and means to automatically move said cam relative to said actuating fingers.

5. A mechanism of the nature disclosed, comprising punching mechanism, a pair of arms, each pivoted at an intermediate point to a common base, a centering finger carried by each arm on the same side of its pivot, said centering fingers terminating opposite to one another, an actuating finger carried by each of said arms on the other side of said pivot and terminating opposite one another, a cam adapted to reciprocate between said actuating fingers to simultaneously actuate the same and thereby cause said centering fingers to center the bar during the punching operation, and means to automatically reciprocate said cam.

6. A mechanism of the nature disclosed, comprising punching mechanism, a pair of arms, each pivoted at an intermediate point to a common base, a centering finger carried by each arm on the same side of its pivot, said centering fingers terminating opposite to one another, an actuating finger carried by each of said arms on the other side of said pivot and terminating opposite one another, a two-part wedge-shaped cam adapted to reciprocally translate between said actuating fingers to simultaneously actuate the same and thereby cause said centering fingers to center the bar during the punching operation, and means to automatically translate said cam.

7. A mechanism of the nature disclosed, comprising a feedway for a stock-bar, a pair of arms pivoted above and below said feedway, respectively, said arms having parts extending over said feedway, a centering finger carried by each of said arms and terminating above and below said feedway in registry therewith, said arms having portions extending to one side of said feedway, and means arranged at one side of said feedway coöperating with said portions to actuate said centering fingers.

8. A mechanism of the nature disclosed, comprising a feedway for a stock-bar, a pair of bar-centering fingers arranged above and below said feedway in registry therewith, and cam means arranged at one side of said feed-way adapted to simultaneously actuate said centering fingers.

9. A mechanism of the nature disclosed, comprising a feedway, a pair of arms pivoted to a common base above and below said feedway, respectively, a centering finger carried by each of said arms and terminating opposite one another above and below said feedway, said arms each having extensions on the other side of said pivot points, said extensions terminating at one side of said feedway, actuating fingers carried by each of said extensions and terminating opposite one another, and a cam intervening between the extremities of said actuating fingers and adapted to be reciprocated to simultaneously actuate the same.

10. A mechanism of the nature disclosed, comprising a reciprocating punch, a counterpart die plate coöperating with said punch, automatic means for interposing the end of a stock-bar between said die plate and said punch, a pair of fingers adapted to engage the narrow edges of a rectangular stock-bar at a point closely adjacent said die, automatic means for moving each of said fingers into a position equidistant from the center of the aperture in said die, a plate arranged on the punch side of said stock-bar and having an aperture through which the punch may pass, and means for causing said plate to clamp said stock-bar against said die during the advance of said punch and for enabling said stock-bar to be freed preparatory to a further feed during the retreat of said punch.

11. A mechanism of the nature disclosed comprising, in combination, a main frame, a sub-frame supported by said main frame and adapted to reciprocate thereon, a shearing-off punch carried by said reciprocating sub-frame, a perforating punch carried on said sub-frame, means for feeding stock into operative relation with said punches to enable said shearing-off punch to shear blanks from the end thereof and said perforating punch to perforate said stock adjacent its end, and means for slightly retracting said stock before the shearing-off punch has returned to its initial position.

12. A mechanism of the nature disclosed comprising, in combination, a main frame, a sub-frame supported by said main frame adapted to reciprocate thereon, a perforating punch carried by said sub-frame, a shearing-off punch carried by said sub-frame near said perforating punch and terminating forwardly beyond said perforating punch, means for feeding a stock-bar into operative relation with said punches whereby, during the advance of said sub-frame, the shearing-off punch will first shear off the blank from the end of said stock-bar and the perforating punch will then perforate said stock-bar, and means for slightly retracting said stock-bar immediately after the withdrawal of said perforating punch and prior to the return of the shearing punch to its initial position.

13. A mechanism of the nature disclosed comprising, in combination, means adapted to punch a stock bar, means adapted to feed a stock bar to said punching means, two members adapted to respectively abut circumferentially different portions of said stock bar, means adapted to move said members so as to press said bar in a direction transversely of the punching axis and position the same, and separate means adapted to clamp said bar in fixed position while being punched.

14. A mechanism of the nature disclosed comprising, in combination, means adapted to punch a stock bar, means adapted to feed a stock bar to said punching means, two positioning members adapted to respectively abut circumferentially different portions of said stock bar, means adapted to move said members so as to press said bar in a direction transversely of the punching axis, and separate means comprising a reciprocatory clamping plate adapted to clamp said bar in fixed position while being punched.

15. A mechanism of the nature disclosed comprising, in combination, a perforating and an adjacent shearing punch, means adapted to intermittently advance a stock bar into punching position, means adapted to advance said punches and thereby cause the same to perforate said bar and sever a perforated blank therefrom, respectively, means adapted to retract said punches to initial position preparatory to a succeeding punching operation, and means adapted to retract said bar before said shearing punch attains said initial position and before a succeeding advance of said bar.

16. A mechanism of the nature disclosed comprising, in combination, a perforating and an adjacent shearing punch, the shearing punch being disposed in advance of the perforating punch, means adapted to intermittently advance a stock bar into punching position, means adapted to advance said punches and thereby cause the same to perforate said bar and sever a perforated blank therefrom, respectively, means adapted to retract said punches to initial position preparatory to a succeeding punching operation, and means adapted to retract said bar after the perforating punch leaves the bar and while said shearing punch is in line with said bar.

17. A mechanism of the nature disclosed, comprising a main shaft extending from one side of the machine to the other, a cam arranged on one extremity of said shaft, a stock bar feeder arranged a distance from said shaft and adapted to feed the stock bar in a direction substantially parallel with said shaft, levers interposing between said cam and said stock bar feeder to actuate the same through the instrumentality of said shaft, a feedway for receiving the stock bar, a shaft arranged on the opposite side of said machine at right angles to said main shaft and in mesh therewith, a cam arranged on said second shaft, means extending from said cam to the other side of said machine adjacent said stock bar feeder, and a bar-centering mechanism connected with and actuated by said means and extending toward the center of the machine in the direction of the feedway for the stock bar.

18. A mechanism of the nature disclosed, comprising a main driving shaft extending from one side of the machine to the other side thereof, a stock bar feed arranged at one side of the machine a distance from said shaft, means extending from said shaft to said feed, mechanism adapted to actuate the same for feeding a stock bar in a direction in substantial parallelism with said shaft, a bar-centering mechanism adapted to operate on said stock bar at a point adjacent the center of the machine, and means intervening between said centering mechanism and the main shaft on the opposite side of said machine for actuating said centering mechanism.

19. A mechanism of the nature disclosed, comprising a reciprocating punch, a counterpart die adapted to coöperate with said punch, means for feeding a stock bar between said die and punch, a member arranged on the punch side of said stock bar, and means for forcing said member toward said stock bar to clamp the latter against the die preparatory to the operation of the punch.

20. A mechanism of the nature disclosed, comprising a reciprocating punch, a counterpart die plate adapted to coöperate with said punch, means for intervening a stock bar between said die plate and punch, a member arranged on the punch side of said stock bar and providing an aperture through which said punch may pass, and means for moving said member to clamp said stock bar against said die preparatory to the advance of said punch.

21. A mechanism of the nature disclosed, comprising a reciprocating punch, a counterpart die adapted to coact with said punch, means for intervening a stock bar between said punch and said die, a member arranged on the punch side of said stock bar and having an aperture for accurately positioning the punch, a mechanism extending at right angles to the direction of feed of the stock bar and connected to said member, and cam means for operating the said mechanism to cause said member to advance toward said die and clamp the stock bar in place preparatory to being apertured by said punch.

22. A mechanism of the nature disclosed, comprising a reciprocating punch, a counterpart die-plate adapted to coöperate with said punch, automatic feed mechanism for intervening the end of a stock bar between said punch and die, an automatic device adapted to engage the end of the stock bar adjacent said die to accurately center the same with respect to said punch, a member arranged on the punch side of said stock bar for clamping said stock bar in place at the instant of punching, and means for enabling said member to move into releasing position during the withdrawal of said punch from said stock bar whereby the stock bar may be freed for a further feed.

23. A mechanism of the nature disclosed, comprising a reciprocating punch, a counterpart die-plate coöperating with said punch, automatic means for interposing the end of a stock bar between said die-plate and said punch, a pair of fingers adapted to engage the narrow edges of a rectangular stock bar at a point closely adjacent said die, automatic means for moving each of said fingers into a position equidistant from the center of the aperture in said die, a plate arranged on the punch side of said stock bar and having an aperture through which the punch may pass, and means for causing said plate to clamp said stock bar against said die during the advance of said punch and for enabling said stock bar to be freed preparatory to a further feed during the retreat of said punch.

In testimony whereof we affix our signatures in the presence of two witnesses.

WILLIAM L. WARD.
HERBERT D. REMSEN.
EMILE C. BOERNER.

Witnesses:
ROBERT J. SNYDER,
HOWARD E. MARSHALL.